Jan. 3, 1961 L. VIANINI 2,966,715

APPARATUS FOR THE MANUFACTURE OF MULTI-LAYER TUBULAR BODIES

Filed June 12, 1957 4 Sheets-Sheet 1

INVENTOR:
LUIGI VIANINI
BY H. John Michel
ATTORNEY

APPARATUS FOR THE MANUFACTURE OF MULTI-LAYER TUBULAR BODIES
Filed June 12, 1957 4 Sheets-Sheet 2
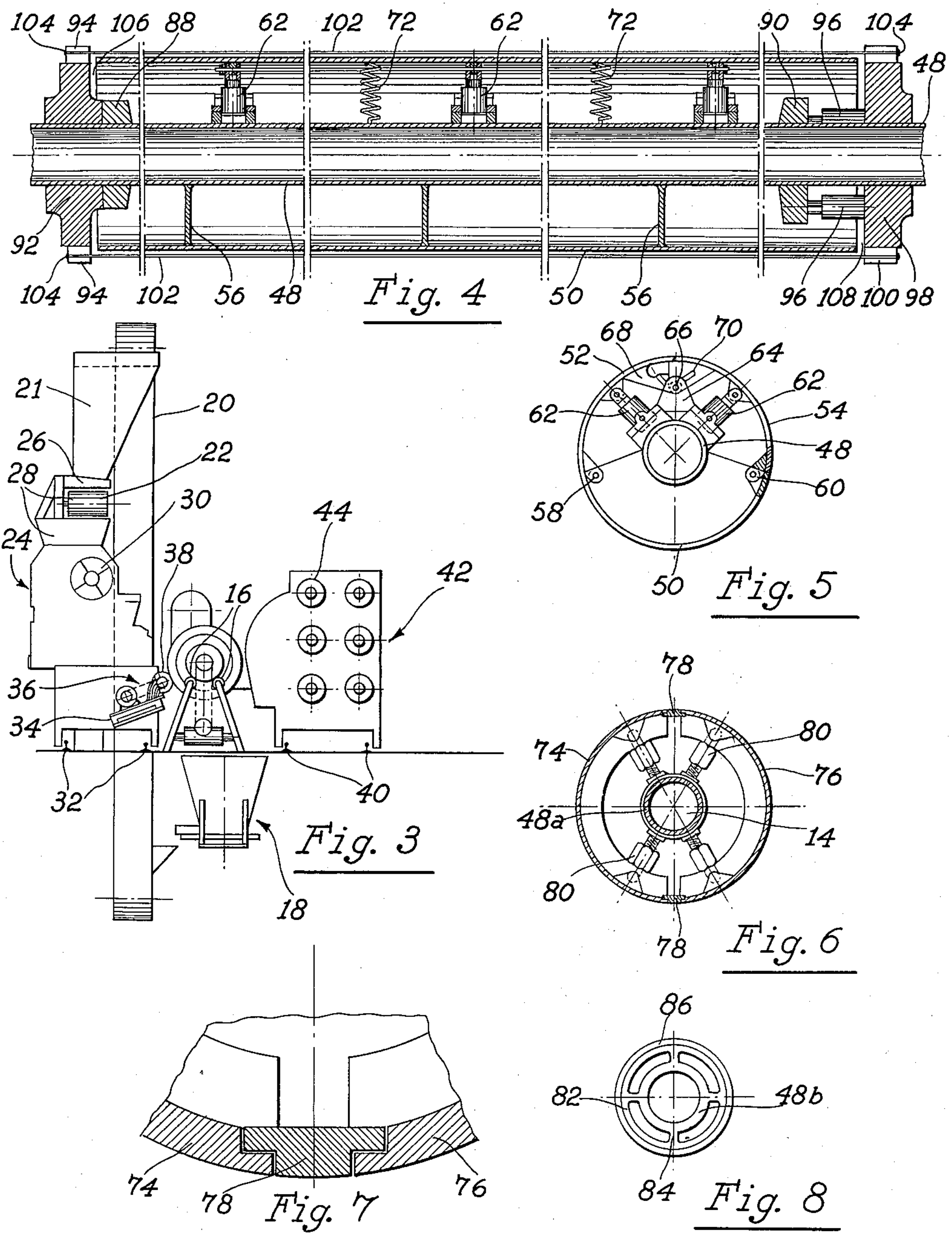
INVENTOR:
Luigi VIANINI
By A. John Michel
ATTORNEY

APPARATUS FOR THE MANUFACTURE OF MULTI-LAYER TUBULAR BODIES

Filed June 12, 1957 4 Sheets-Sheet 3

INVENTOR:
LUIGI VIANINI
BY
Kurt Kelman
his Agent

APPARATUS FOR THE MANUFACTURE OF MULTI-LAYER TUBULAR BODIES

Filed June 12, 1957 4 Sheets-Sheet 4

INVENTOR:
LUIGI VIANINI
BY
Kurt Kelman
his Agent

United States Patent Office 2,966,715
Patented Jan. 3, 1961

2,966,715

APPARATUS FOR THE MANUFACTURE OF MULTI-LAYER TUBULAR BODIES

Luigi Vianini, 41 Via della Ferratella, Rome, Italy

Filed June 12, 1957, Ser. No. 666,266

Claims priority, application Italy Feb. 11, 1957

10 Claims. (Cl. 25—30)

The present invention relates to an apparatus for the production of tubular, particularly cylindrical, bodies of concrete or the like.

The main object of the invention is to provide an apparatus for the manufacture of tubular, particularly cylindrical, bodies whose reinforcement consists of thin and closely adjacent metallic elements which are distributed throughout the whole wall of the tubular body so as to form a composite and substantially uniform structure. Each layer of the concrete mixture is reinforced individually which is of great advantage as it permits for better utilisation of the reinforcing metal.

In the manufacture of such tubular bodies, comparatively thin layers of cementitious material are formed about a central core, and each layer is reinforced by closely adjacent convolutions of thin wire, the number of layers depending upon the wall thickness, which in turn depends upon the stresses to which the body is subjected when in operation. All hitherto known methods and machines did not prove as economically and technically satisfactory because they require a pressing and/or a setting of each concrete layer before the application of the reinforcing elements, which results in a great loss of time.

Moreover, the presently known machines invariably require separate devices for the application and stretching of longitudinal reinforcing elements which cause the longitudinal pre-compression of the tube.

It was hitherto proposed to effect the removal of the core from a cylindrical body through deformation of the body itself, particularly when the employed material is an asbestos-cement mixture or the like, or by utilizing collapsible cores. Collapsible cores of presently known design are unsatisfactory, particularly as the dimensions of the tubular body increase, because they are unable to withstand the stresses resulting from the application of transversal and longitudinal reinforcing elements, especially when such elements are applied under an initial tension.

In the manufacture of multi-layer tubular bodies, I employ a concrete mixture whose water content is near to the practical lowest limit hitherto considered in the art, but always sufficient for the hydration of the cement, and whose constituents are cement and other materials of small size, such as sand, short asbestos fibers, and glass fibers, singularly or in combination. The apparatus comprises means for violently projecting a jet of concrete onto a rotating core of a collapsible or shrinkable type by means of a projection device which is moved in a direction parallel to a generating line of the core, a device for smoothing and levelling the projected material in order to obtain a layer of a predetermined thickness, as for instance a milling-tool, a grinding-tool or other tool, and a device for winding a number of circumferential reinforcing wires. The other layers are formed in a similar way by reverting the direction of translation of the above mentioned devices, until about a half of the desired wall thickness is obtained. In the next step, the longitudinal reinforcing elements are placed into contact with the outer surface of the already formed portion of the tube. The longitudinal reinforcing elements extend between two supports, one disposed at each end of the core, and the supports are thereupon forcibly moved away from each other in order to subject the longitudinal reinforcing elements to a predetermined tension. Additional layers of concrete, each circumferentially reinforced, are then formed in the above described manner in order to produce a tube of the required wall thickness. In the final step, the core is caused to collapse or shrink in order to permit removal of the finished product.

By utilizing a comparatively dry and compact concrete, and by applying the concrete to the core in the form of a jet to insure proper adhesion, only excess material is removed during the smoothing and levelling operation.

A jacket or layer of a material which is impervious and resistant to the action of the fluid to be conveyed or contained in the finished product may be formed within or between the layers of the tube.

The novel apparatus comprises essentially a horizontal driven shaft to rotate a core; a collapsible or shrinkable core; a proportioning and mixing device for the cementitious mixture; conveyors to supply the mixture to a travelling projection, or jet forming device; tracks parallel to a generating line of the core for guiding the projection device; a device for levelling and smoothing the material projected onto the core, said device being movable on its own tracks or on the tracks of the projection device; a collecting conveyor whose purpose is to recover the material removed during the smoothing operation; a plurality of bobbins for the thin reinforcing wires, said bobbins being carried by a supporting structure which is movable on its own tracks; a pair of members for the temporary anchorage of the longitudinal reinforcing wires; and means for forcibly moving said anchorage members away from each other so as to subject the longitudinal wires to a predetermined tension.

The invention will be described in greater detail with reference to the accompanying drawing wherein:

Fig. 3 is an end view thereof.

Fig. 4 is a longitudinal section through one form of a collapsible core.

Fig. 5 is a transversal section of the core shown in Fig. 4.

Fig. 6 is a transversal section of another embodiment of the collapsible core.

Fig. 7 is a greatly enlarged fragmentary detail view of the core shown in Fig. 6.

Fig. 8 is an end view of a shrinking core.

Figure 1:
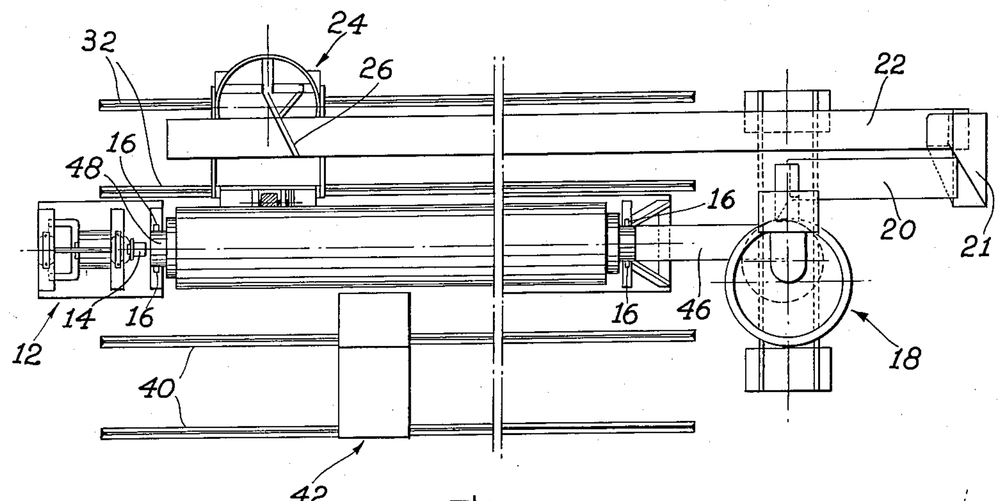
Fig. 1 is a plan view of the machine embodying my invention.
Figure 2:
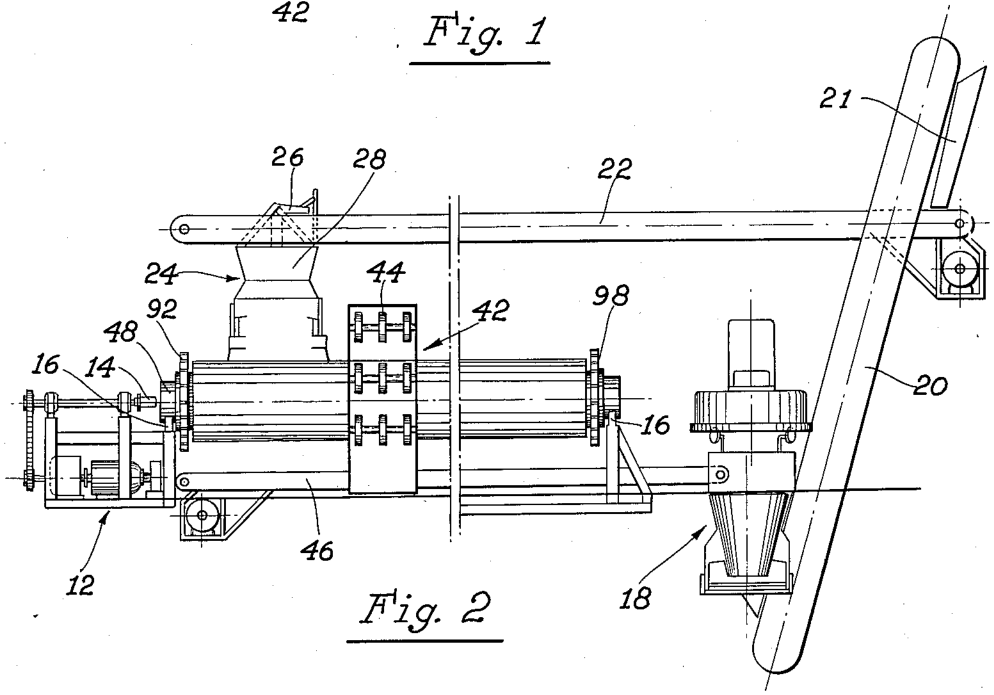
Fig. 2 is a side elevational view thereof.

The apparatus comprises an assemblage designated as a whole by the numeral 12, adapted to impart a rotary motion, at any desired speed, to a clutch 14 which latter may be connected to the hollow inner shaft 48 of a core rotatably supported at each end by a pair of rollers 16. The spacing of the rollers 16 may be varied in order to suit shafts of different diameters. A fixed proportioning and mixing device 18 delivers the mixture of cementitious material to a lifting conveyor 20 which pours the mixture into a hopper 21. The hopper discharges the mixture onto a horizontal conveyor 22 running above the path of a projection device 24 which latter can be moved in a direction parallel to the generating line of the core. Said device 24 comprises a scraping blade 26 which collects the mixture from the conveyor 22 and causes it to drop into a hopper 28. In other words, scraper 26 limits the travel of the mixture according to the position of the projection device 24. The latter further comprises a projection member, preferably a centrifugal paddle wheel 30, constituting the means for violently directing a jet of mixture of cementitious material onto the core. The running tracks for the device 24 are designated by reference numeral 32.

The tracks 32 slidably support a frame including a base 34 which mounts a unit 36, comprising a milling or grinding tool 38 or other smoothing and levelling means for the concrete material. A cutting tool in the form of a worm screw was found particularly suitable. The rails 32 must allow the smoothing or levelling device to travel beyond both ends of the shaft 48. The smoothing device will be described in greater detail in connection with Fig. 9.

A supporting frame 42 for a plurality of bobbins 44 is slidably mounted on the rails 40, each bobbin supplying one reinforcing wire as will be described in greater detail in connection with Figs. 9 and 10. At the beginning of the formation of a tube, the ends of the wires are anchored in the core, and the wires are guided during the operation so as to maintain a fixed distance from each other in order to form substantially cylindrical spirals when the core is rotated.

To wind up the wires under requisite tension, the bobbins 44 are braked in a manner to be described in connection with Fig. 9.

During the levelling operation of the projected material by the milling or grinding tool 38, some material is removed and falls onto belt conveyor 46, from which said material is poured again to the proportioning and mixing device 18, so that the excess material is recovered and recycled.

It will be noted that each run of the apparatus results in the application of a new layer, as well as in smoothing and circumferential reinforcement of the newly formed layer.

Each component of the novel apparatus is provided with its own motor and with its own speed adjusting means.

It has been said hereinbefore, that it is an essential condition for the manufacture of tubular bodies consisting of several individually reinforced layers that collapsible or shrinking cores be used.

According to the invention, it is preferred to use mechanically collapsible cores for tubes of a large diameter, and cores which shrink due to the melting of an outer layer for tubes of smaller diameters.

Referring now to Figures 4 and 5, the core shown therein comprises a hollow shaft 48, which may be fastened to the clutch 14. The cylindrical mantle or shell of the core, whose outer diameter corresponds to the inner diameter of the tube to be formed, consists of three parts or sections 50, 52 and 54. Part 50 is fastened to the shaft 48 by means of rigid connections 56, and parts 52 and 54 are connected with the part 50 by means of hinges 58 and 60, respectively. Between each of parts 52 and 54 and the central shaft 48 a set of hydraulic jacks 62 is provided. For manufacturing the tube, the core is disposed in the position shown in Figures 4 and 5, in which parts 50, 52 and 54 form a cylindrical shell. To maintain the parts 52 and 54 in such position, supports 64 are provided, which are fastened to or integral with the shaft 48 and are connected by means of a rod 66 to the ears 68 and 70 of the core parts 52 and 54. The connection is effected by means of slots in said ears through which the rods 66 pass, so as to form movable joints. In one end position of these joints the core assumes a cylindrical shape. The tube having been formed, it is sufficient to operate the jacks 62 in order to pivot the parts 52 and 54 about the hinges 58 and 60, respectively, thus reducing the area of the cross section of the core and facilitating its withdrawal from the tube. Return springs 72 may be provided to facilitate the rotation of parts 52 and 54.

In the modification shown in Figures 6 and 7, the outer part or shell of the core consists of two slightly less than semicylindrical sections or parts 74 and 76, which form a cylindrical shell when the longitudinal keys 78 are interposed between their longitudinal edge portions. Between the parts 74 and 76 and the central shaft **48*a*, which may be fastened to and rotated by the clutch 14, a number of jacks 80 are interposed. To remove the finished tube from the core, it is sufficient to remove the longitudinal keys 78 and to contract the jacks 80**, which may be screw-jacks.

A shrinking core of the type preferred in the manufacture of tubular bodies of smaller diameters is represented in Fig. 8.

A hollow cylinder 82, the outer diameter of which is smaller than the inner diameter of the tubular body to be formed, is fixed by means of rigid supports 84 to a hollow shaft **48*b*, which is to be connected to the clutch 14 of the machine. The core comprises an outer layer 86 which is applied to the cylinder 82 and whose outer diameter equals the inner diameter of the tubular body to be formed. While parts 82, 84 and 48*b* are made of heat resistant material, such as steel, layer 86** is made of a material which is hard at room temperature but softens or melts when heated to a comparatively low temperature, in any case at a temperature at which the concrete tubular body will not be damaged.

It will be readily understood that, the tubular body having been manufactured on a composite core of the above mentioned kind, a moderate heating will be sufficient to soften or melt the outer layer of the core, so that the removal of the core may be readily effected.

The melting temperature of the material of the outer layer may be in the range from 100° C. to 200° C. or even 250° C., depending on the setting of the concrete at the time of removal of the core.

The materials for the outer layer may be chosen from the wide class comprising waxes and natural or synthetic resins and mixtures thereof, eventually mixed with filling material, or from the class comprising metals and alloys having a low melting-point.

The softening and melting of the outer layer for the removal of the finished body from the core will be effected by heating the metallic cylinder 82 by means of steam, superheated steam, electric resistances, or other heating means.

The thickness of the outer layer depends only on the facility of removal from the core and in practice will be between 2 and 3 mm.

The means for the application and tensioning of the longitudinal reinforcing wires is shown in axial section in Fig. 4. Two annular members 88 and 90 are fastened to the hollow shaft 48. Against member 88 bears a wire supporting member 92, which is provided with grooves 94 extending in a direction parallel to the core axis. Against annular member 90 bear hydraulic jacks 96, which are fastened to a second wire supporting member 98 provided with grooves 100 corresponding to the grooves 94 of member 92. The rods or wires 102 are made with end heads 104, which cooperate with the outer faces of members 92 and 98, said heads having a larger diameter than the width of grooves 94 and 100 respectively. When a predetermined wall thickness is reached, rods or wires 102 are inserted into corresponding grooves 94 and 100 and the members 92 and 98 are then moved away from each other by operating the jacks 96, whereby the rods or wires 102 are caused to stretch to a predetermined extent. Afterwards, the tube wall is completed and the rods or wires remain under tension when the concrete mixture sets.

Of course, instead of using rods or wires provided with end heads, it is possible to use rods or wires of a constant diameter fastened to the members 92 and 98 by means of clamps of any suitable type.

At any time during the manufacturing operation, it is possible to coat the already formed portion of the tube with a layer of impermeable material.

Further, the core may be coated with a layer designed to remain in place in the finished tube, this layer being made of a material which is resistant to the action of the fluid to be conveyed through a pipe-line consisting of concrete tubes manufactured in accordance with this invention.

Figure 9:
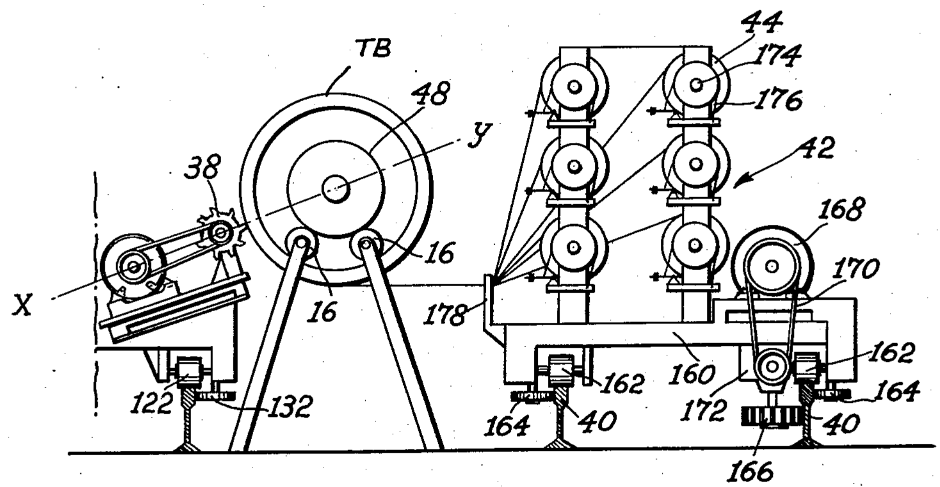
Fig. 9 is a detailed view of the winding device for applying a series of wire convolutions to a layer of cementitious material on the core.

Fig. 9 illustrates in greater detail the wire winding or convoluting means. The frame 42 of the winding device comprises a base 160 whose wheels 162 travel along the rails 40, and also carries two sets of rollers 164 which engage the outer sides of the rails 40 in order to prevent lateral displacements of the winding device in directions at right angles to the rails 40. The rollers 164 are rotatable about vertical axes. The right-hand rail 40 is formed with a toothed rack which meshes with a pinion 166, the latter being driven by a motor 168 over a belt 170 and a gear box 172. Thus, the motor 168 may cause the frame 42 to travel along the rails 40 in the longitudinal direction of the core, and the gear box 172 allows for variations in the forward speed of the winding device.

Each group consisting of three bobbins 44 is fastened to a horizontal shaft 174 provided with a hand brake 176 for imparting tension to the wires led about the tubular body TB which is formed on the rotating core. The wires payed out by the bobbins 44 are held in properly spaced position by a perforated plate 178 which is fixed to the base 160 of the frame 42.

Figure 10:
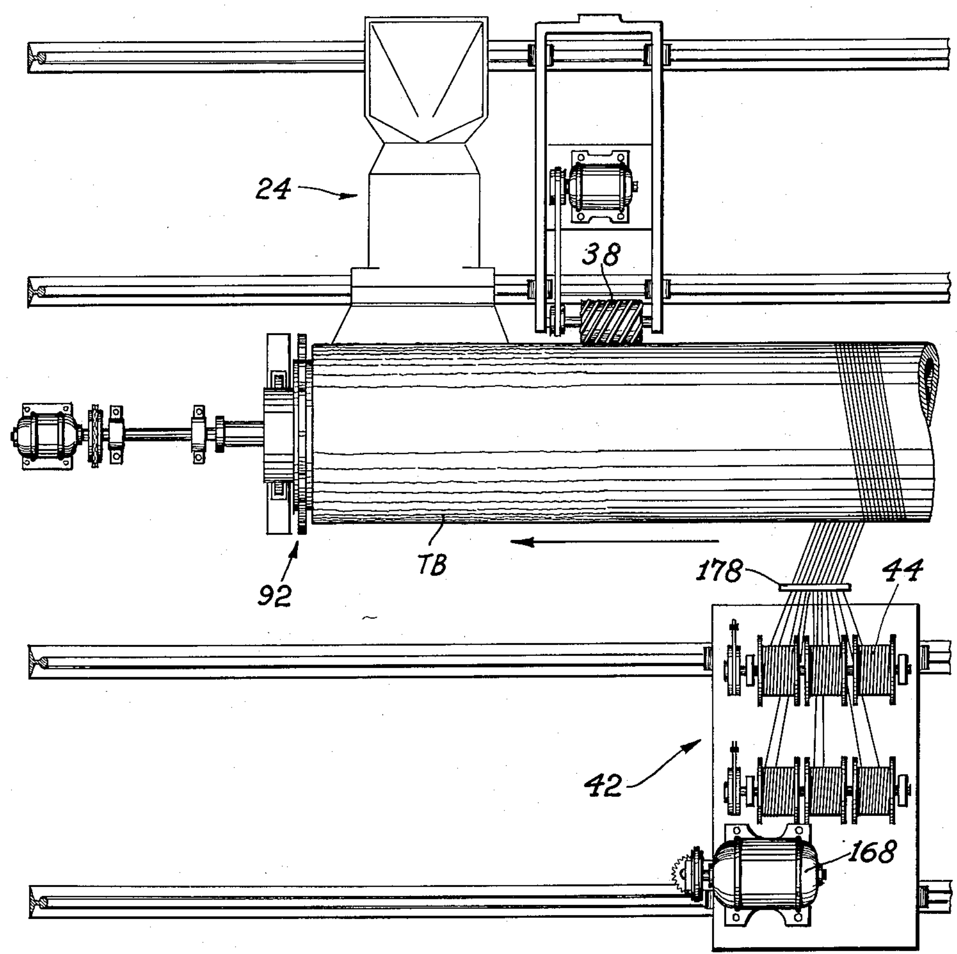
Fig. 10 is a fragmentary diagrammatic view of the apparatus showing the formation of a layer in a direction from the right-hand to the left-hand end of the core.

Fig. 10 illustrates the formation of a layer of cementitious material on the core of the tube forming apparatus. The jet producing or projection device 24 and the smoothing device including the tool 38 move at the same forward speed, the tool 38 trailing the device 24 and the winding frame 42 trailing the member 38 at the same speed.

The apparatus is suitable for the manufacture of tubular bodies with different diameters, and also the thickness of the layers, the diameters of the reinforcing wires and the spacing thereof may be different, if necessary. For example, the mixing unit 18 having been adjusted to deliver a cementitious mixture at the appropriate rate for the manufacture of a tubular body whose layers have a thickness of from five to ten millimeters, the projection device is moved at a speed of about one meter per twenty-five seconds. The cementitious material is projected onto the upper half of the core. The levelling and smoothing unit is started to follow the projection unit at the same speed at a distance from thirty to forty centimeters. The winding unit is started to follow the smoothing unit at the same speed and at a distance from forty to fifty centimeters. The wires may have a diameter of from 0.5 to 0.8 millimeter.

On manufacturing a tube, the projection device and the winding means or support for the wire bobbins are placed at one end of the core, while the tool 38 of the smoothing, levelling and material removing device is located behind the projection device (see Fig. 11). A gap 106 is formed between the member 92 and the near end of the core, and another gap 108 is formed between the member 98 and the other end of the core. In the first run, the projection device 24 is started, immediately followed by the smoothing and levelling device 36 and then by the winding means or support 42 for the wire bobbins 44. The projection device is stopped when it passes the other end of the core, and the smoothing and material removing tool is stopped immediately beyond said core end. The support or winding means for the wire bobbins is arrested as soon as it reaches the end of the core. The position of the projection and smoothing devices on the rails 32 is then reversed, and the projection device is again started in a reverse direction, immediately followed by the smoothing and evening tool which has been radially retracted a distance corresponding to the thickness of the new layer to be formed, and finally the support for the reinforcing wire bobbins is started, so that the wires will always lie on a finished surface.

While the invention has been described and illustrated with reference to the manufacture of tubular cylindrical bodies, such as the sections of pipe-lines, the novel apparatus may be utilized also for the manufacture of poles and other bodies having a conical or tapered form from end to end.

What I claim is:

1. An apparatus for the manufacture of multilayer tubular bodies of cementitious material which comprises, in combination: an elongated core having a shrinkable mantle, a first end, a second end, and a coaxially disposed hollow shaft connected with and supporting said mantle; means for imparting rotary motion to said shaft; coupling means for connecting the last mentioned means with said shaft; mixing means for forming a comparatively dry mixture of cementitious material; projecting means including means for violently directing a jet of cementitious material against the mantle of said core to form a layer thereon; means for guiding and advancing said projecting means between the ends and in parallelism with the axis of said core; first conveyor means between said mixing means and said projecting means for delivering to the latter a supply of cementitious material; levelling means for smoothing and reducing the thickness of the layer on said core; means for guiding and advancing said levelling means between the ends and in parallelism with the axis of said core; second conveyor means disposed between said levelling means and said mixing means for collecting and returning to the latter the material removed from the layer on said core; winding means comprising a supply of reinforcing wire and each wire being anchored in said core; and means for guiding and advancing the winding means in parallelism with the axis and between the ends of said core whereby a plurality of convolutions is applied to the layer on said core, the levelling means trailing said projecting means and the winding means trailing said levelling means when a layer is formed on said core.

2. The structure as set forth in claim 1, wherein said first conveyor means comprises a lifting conveyor for receiving the cementitious material from said mixing means and a horizontal conveyor receiving the material from said lifting conveyor which is disposed above said projecting means and extends between the ends of said core; and wherein said projecting means comprises a hopper and a scraping member in contact with said horizontal conveyor for directing the material into said hopper while the projecting means advances beneath said horizontal conveyor.

3. The structure as set forth in claim 1, wherein said levelling means comprises a cutting member in the shape of a worm screw.

4. The structure as set forth in claim 1, wherein said second conveyor means is a belt conveyor disposed beneath said levelling means and extending between the ends of said core.

5. The structure as set forth in claim 1, further comprising a pair of substantially circular supporting members carried by said shaft adjacent to the respective ends of said core, each supporting member having a peripheral zone defining a plurality of recesses for reception of reinforcing wires therein in such manner that the last mentioned wires extend longitudinally of said core between said supporting members; and means for tensioning the last mentioned wires including a pair of annular members each fixed to said shaft intermediate said supporting members with one of said annular members abutting one of said supporting members, and jack means disposed between the other of said annular members and the other of said supporting members for moving the latter away from said last mentioned annular member whereby to tension the wires received in the grooves of said supporting members.

6. The structure as set forth in claim 1, wherein said mantle consists of a plurality of rigid arcuate sections and further comprising jack means disposed between each of said sections and said shaft.

7. The structure as set forth in claim 1, wherein said mantle comprises three rigid sections, one of said sections being rigidly connected with said shaft; hinge means for connecting said one section with the other two sections, and jack means between each of said other two sections and said shaft.

8. The structure as set forth in claim 1, wherein said mantle comprises a pair of sections of slightly less than semi-cylindrical contour, each of said sections having a pair of longitudinal edge portions with each edge portion of one of said sections adjacent to one edge portion of the other section, jack means between each section and said shaft for connecting the respective sections with and for moving the respective sections relative to said shaft, and a pair of elongated keys insertable between the adjacent edge portions of said sections.

9. The structure as set forth in claim 1, wherein said mantle comprises a metallic cylinder rigidly connected with said shaft, and a layer of heat softenable material surrounding said cylinder, the material of said last mentioned layer having a softening point not exceeding 250° C.

10. An apparatus for the manufacture of multilayer tubular bodies of cementitious material which comprises, in combination: a core having a shrinkable mantle, a first end, a second end, and a hollow shaft connected with and supporting said mantle; a horizontal driving shaft coaxial with said hollow shaft for rotating same; clutch means for connecting said driving shaft with said hollow shaft; adjustably mounted roller means disposed in pairs for rotatably and removably supporting said hollow shaft; a mixing device for forming a comparatively dry mixture of cementitious material and for delivering the material at an adjustable rate; a projecting device including a centrifugal bladed wheel for vehemently directing a jet of cementitious material against the mantle of said core to form a layer thereon; means including guide elements extending between the ends and in parallelism with the axis of said core for advancing the projecting device longitudinally of said core in two directions; conveyor means between said mixing device and said projecting device for delivering to the latter a supply of comparatively dry cementitious material in any given position of the projecting device between the ends of said core; a device for levelling, smoothing and reducing the thickness of the layer on the mantle of said core including a severing member in contact with the layer; means operatively connected with said levelling device for guiding and advancing same in parallelism with the axis and between the ends of said core; a collecting conveyor for receiving the material removed from the layer by said severing member and for returning the material to said mixing device; a plurality of coils each comprising a supply of reinforcing wire, each wire being anchored in said core; support means for said coils; means for guiding and advancing said support means in parallelism with the axis and between the ends of said core whereby a plurality of convolutions is applied to the layer on said core; a pair of supporting members supported by said hollow shaft, each at one end of said core, each of said two last mentioned members comprising means for supporting a plurality of wires; and a plurality of reinforcing wires removably supported by said two last mentioned members and extending adjacent to said mantle longitudinally of the core, said levelling device trailing the projecting device and said support means trailing the levelling device when a layer is formed on said core.

References Cited in the file of this patent

UNITED STATES PATENTS

| | | |
|---|---|---|
| Re. 16,523 | Bille | Jan. 4, 1927 |
| Re. 18,334 | Darwin | Jan. 19, 1932 |
| 851,395 | Blaw | Apr. 23, 1907 |
| 870,144 | Walker | Nov. 5, 1907 |
| 1,134,202 | Jensen | Apr. 6, 1915 |
| 1,455,686 | Wallace | May 15, 1923 |
| 1,539,964 | Siegwart | June 2, 1925 |
| 2,061,105 | Ruml | Nov. 17, 1936 |
| 2,269,032 | Moore | Jan. 6, 1942 |
| 2,326,010 | Crom | Aug. 3, 1943 |
| 2,696,353 | Vessels | Dec. 7, 1954 |
| 2,701,905 | Sullivan | Feb. 15, 1955 |
| 2,747,249 | Chiverton | May 29, 1956 |
| 2,816,323 | Munger | Dec. 17, 1957 |